May 18, 1965 J. C. MARINACE 3,184,350
FLUOROCARBON COMPOUND USED IN MASKING OF EPITAXIAL
GROWTH OF SEMICONDUCTORS
BY VAPOR DEPOSITION
Filed April 2, 1962

INVENTOR
JOHN C. MARINACE

BY John F. Ahlandt Jr.
ATTORNEY

United States Patent Office 3,184,350

Patented May 18, 1965

3,184,350
FLUOROCARBON COMPOUND USED IN MASKING OF EPITAXIAL GROWTH OF SEMICONDUCTORS BY VAPOR DEPOSITION

John C. Marinace, Yorktown Heights, N.Y., assignor to International Business Machines Corporation, New York, N.Y., a corporation of New York Filed Apr. 2, 1962, Ser. No. 184,206
6 Claims. (Cl. 148—175)

This invention relates to the art of vapor growth of semiconductor bodies, and, in particular, to a masking technique for the mass fabrication of semiconductor elements suitable for use in signal translating devices.

In the fabrication of a plurality of semiconductor devices by growth of semiconductor material from the vapor phase, it has been the practice to use a masking technique whereby a semiconductor substrate, upon which the devices are to be formed, is suitably covered by, for example, a mask made of glass. Such a masking technique has been described in the IBM Journal of Research and Development, vol. 4, No. 3, July 1960, pp. 261–263. The particular technique disclosed therein permits, in a single operation, the simultaneous fabrication of a plurality of devices in spatial relationship whereby all the devices in the array exhibit identical performance characteristics.

The use of a mask of glass, or similar material, involves considerable expense due to the fact that a very close fit must be had between the surface of the substrate and the contacting surface of the mask. In addition, it is sometimes necessary that the mask be left in place after the fabrication of the plurality of devices has been accomplished. In the latter case, then, a separate mask is required each time a bath of devices is fabricated.

The masking technique, as described in the aforesaid reference, is utilized in conjunction with a vapor growth process of fabricating monocrystalline semiconductor bodies. One particular example that has been successfully employed is the halide disproportionation vapor growth process. In this process a semiconductor source material is reacted with a halogen transport element in a first temperature zone of a reaction container to form thereby a vaporous semiconductor halide compound. The compound thus formed circulates to, and is decomposed in, a second temperature zone thereby freeing the semiconductor material which deposits epitaxially and forms a layer on a monocrystalline substrate provided in the second zone. This halide disproportionation process has been amply disclosed in the same IBM Journal of Research and Development, starting at p. 247.

What has been discovered is that certain fluorocarbon compounds, and, in particular, the fluorocarbon compound which is marketed under the trade name Teflon, may be utilized to provide masking of a substrate so that semiconductor material in a vapor growth process may be selectively deposited onto the substrate in discrete areas. There are two chemical formulas for Teflon. The first form developed from the polymerization of tetrafluoroethylene (TFE) monomer:

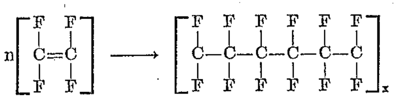

A more recent form results from the polymerization of tetra-fluoroethylene monomer and hexa-fluoropropylene monomer to give fluorinated ethylene propylene co-polymer (FEP).

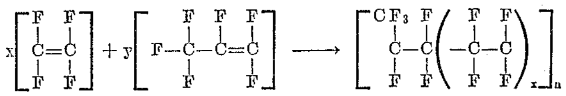

These fluorocarbon compounds thus used for masking are very convenient to apply to the substrate. Neither the compounds nor their constituents contaminate the substrate, nor do they affect the halide reaction. Such masking is very inexpensive as compared with masking by the use of a fixture of glass or similar material. Further, in application of the compounds to the substrate, they can be laid down to microscopic dimensions.

The foregoing and other objects, features and advantages of the invention will be apparent from the following more particular description of a preferred embodiment of the invention, as illustrated in the accompanying drawings.

Figure 1:
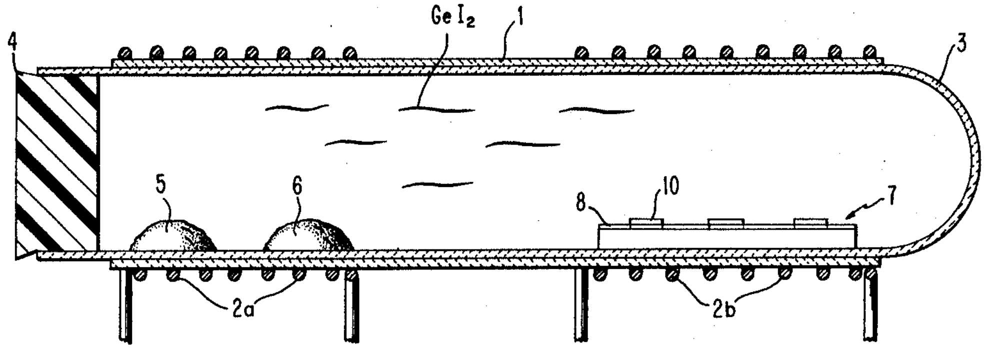
FIG. 1 is a schematic illustration of one form of apparatus to be used, and the reaction involved, in accordance with the technique of the present invention.

Referring now to FIG. 1, there is illustrated a multiple temperature zone furnace, shown schematically, which is constituted of a refractory portion 1, which is surrounded by a plurality of windings *2a* and *2b*, which windings are connected to a source of power not shown.

A container 3, sealed with a plug 4, is situated within the furnace, and deposited in the container at one end is a source of iodine 5. In this same heating zone, on the left, there is also disposed a quantity of semiconductor material 6 serving as a source for the basic halide reaction which will eventuate in the deposition and crystal growth of semiconductor material. At the right end of the tube, there is situated a plurality of substrate wafers 7 which, typically, may be of germanium.

In operation, in accordance with the basic halide disproportionation reaction, power is applied to the windings *2a* and *2b* to provide the requisite temperatures in the respective zones. On the left, where the source of iodine 5 and source of semiconductor material 6 are located, a temperature on the order of 500° C. is provided. On the right, where the wafers 7 are located, a slightly lower temperature, on the order of 400° C., is provided.

With the temperature gradient provided as described, the iodine 5 is vaporized and reacts with the source of germanium 6 with the result that the major product formed is $GeI_2$ in this part of the reaction container. The disproportionation reaction which governs the transport is:

$$2GeI_2 \rightleftarrows Ge + GeI_4$$

The $GeI_2$ gas, as illustrated in FIG. 1, moves to the right and forms Ge and $GeI_4$ in the substrate zone so that growth of solid semiconductor material occurs on the wafers 7, that is, the solid material builds up epitaxially onto the monocrystalline substrates provided.

The foregoing explains the procedure in a vapor growth process suitable for the practice of the present invention. However, the technique of the present invention provides for masking of the semiconductor wafers 7 before build up of the epitaxial layers of semiconductor material onto the substrates 7. Thus, as is indicated in FIG. 1, a film of layer 8 is situated on the top surface of the wafer 7. It has been found that, if a compound such as polytetrafluoroethylene is thus disposed on the surface of a semiconductor wafer, epitaxial crystal growth will occur only in the uncovered areas.

Figure 2A:
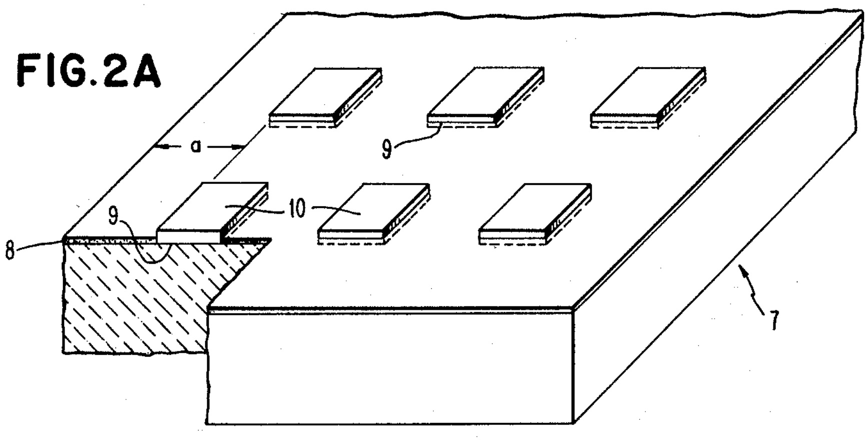
FIG. 2A is a perspective view of a semiconductor configuration obtained by following the technique of the present invention.

Referring now to FIG. 2A, there is illustrated one of the typical wafers 7, which may be employed for the deposition of semiconductor material, on the top surface of which the thin layer 8 of polytetrafluoroethylene has been deposited. This can be achieved simply by scribing the material onto the top surface of the wafer since Teflon is readily available in the shape of a pencil. Thus, to obtain the tiny discrete areas 9 shown in FIG. 2A, a plurality of lines are imposed on the top surface of the wafer 7. First, a series of lines are drawn having a dimension, *a*, as indicated in FIG. 2A, and then a series of lines are drawn perpendicular to the first series so that the only areas uncovered are the aforesaid small areas 9. The substrate or wafer 7 may be selected to be of n-conductivity-type, if desired, and then, in accordance with the particular device configuration that is to be obtained, the material deposited onto the substrate 7 may be of either conductivity-type.

It will be appreciated that rather than scribing lines of Teflon or similar material on the top surface, the Teflon may be evaporated onto the surface by a conventional evaporation technique whereby the substrate would be covered with a stencil initially so that only selected areas would have the fluorocarbon condensed thereon.

After the Teflon film has been disposed on the surface of the substrate 7, the vapor growth process, as previously described in connection with FIG. 1, is initiated and the semiconductor material 10 which deposits as a result of the halide disproportionation mechanism builds up in the discrete areas 9 as shown in FIG. 2A.

It will be understood that, although the deposition of only a single layer of semiconductor material 10 has been shown in FIG. 2A, in accordance with the exemplary apparatus that has been illustated in FIG. 1, other depositions of semiconductor material, such as alternate depositions of opposite conductivity-type material, may also take place upon the masked substrate 7 of FIG. 2A. Thus, in accordance with a modification that will be obvious to those skilled in the art, opposite conductivity-type semiconductor materials may be separately deposited onto the wafer 7 resulting in the build up of alternate layers that will produce particular kinds of desired semiconductor structures.

Figure 2B:
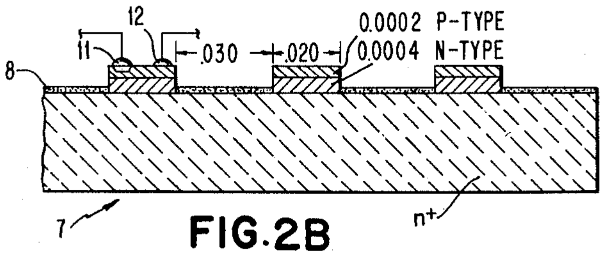
FIG. 2B is a modified semiconductor configuration.

FIG. 2B is illustrative of the structural configuration resulting from the aforesaid modification of the basic vapor growth process. As is indicated in FIG. 2B, a typical substrate 7 of $n^+$ conductivity-type has alternately deposited in the discrete areas opposite conductivity-type semiconductor material. In this configuration a first deposition of n-type mateiral is produced to a depth of approximately .0004 inch followed by a deposition of p-type material to a depth of approximately .0002 inch. Thereafter, by conventional techniques well known to those skilled in the art, an emitter contact 11 is formed by alloying a suitable n-type impurity to the top surface of the p-type layer. Similarly, a base contact 12, which is ohmic, is also made to the p-type layer. Thus, in the structural configuration of FIG. 2B, a plurality of transistor devices having common connection to the $n^+$ substrate are realized. Of course, rather than having an array, as illustrated, which constitutes the final assembly, a group of devices as illustrated may be formed upon a high resistivity substrate, rather than an $n^+$ substrate, and following the deposition of the several layers, the individual devices may be cut from the assembly.

As has been indicated previously, several different varieties or forms of Teflon are suitable and have been used in experiments following the teaching of the present invention. The two varieties of Teflon that have been used are TFE and FEP. In addition, other fluorocarbon compounds, such as that known under the trade name KEL-F have been employed for masking. One chemical formula for KEL-F is:

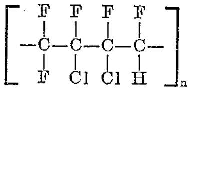

It will be appreciated that, just as there are at least two chemical structures for Teflon, there are other possible structures for KEL-F. In addition, it will be apparent that other varieties and forms of the fluorocarbons having the required properties and characteristics will be suitable for masking in accordance with the technique of the present invention.

Although the precise details of the masking mechanism which is involved by using the compound materials heretofore mentioned are not known and appear to be difficult to determine, it has been hypothesized that a "surface poisoning" occurs. In this phenomenon, foreign atoms of the masking material collect at growth steps or other growth sites and prevent the incorporation of new atoms into the substrate lattice. Regardless of the explanation offered herein, the fact is that the masking compounds produce the results described.

What has been disclosed is a very simple masking technique in a vapor growth process wherein a masking compound, such as polytetrafluoroethylene, is placed upon a semiconductor substrate in all but very small discrete areas so as to enable multiple fabrication of substantially identical devices in a single operation.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. The process for simultaneously fabricating a plurality of semiconductor devices on a substrate comprising the steps of:
   - providing a monocrystalline substrate,
   - coating a major surface of said substrate with a fluorocarbon compound mask to define discrete device areas whereat additional semiconductor material is to be deposited.
   - and exposing said substrate to a decomposing vapor of a semiconductor halide compound whereby semiconductor material is epitaxially deposited in said discrete areas on said monocrystalline substrate.

2. The process as defined in claim 1 wherein said fluorocarbon compound is polytetra-fluoroethylene and said semiconductor material is Ge.

3. The process as defined in claim 1 wherein said deposited semiconductor material has included therein a conductivity-type determining impurity.

4. The process as defined in claim 1 wherein said substrate is of one conductivity-type and the deposited material is of opposite conductivity-type.

5. The process as defined in claim 1 wherein said deposited semiconductor material is composed of alternate layers of opposite conductivity-type.

6. The process as defined in claim 3, further including the step of forming at least one contact to the deposited semiconductor material.

References Cited by the Examiner

UNITED STATES PATENTS 2,666,008 1/54 Enslein et al. ---------- 96—36 X

OTHER REFERENCES

"IBM Journal of Research and Development," vol. 4, No. 3, July 1960, pages 256–263.

DAVID L. RECK, *Primary Examiner.*

WINSTON A. DOUGLAS, *Examiner.*